US008700485B2

(12) United States Patent
Roseman et al.

(10) Patent No.: US 8,700,485 B2
(45) Date of Patent: **\*Apr. 15, 2014**

(54) USER AUTHENTICATION IN AN AUCTION SYSTEM

(75) Inventors: Neil Roseman, Seattle, WA (US); Josh Petersen, Seattle, WA (US); Greg Linden, Seattle, WA (US); Ryan Snodgrass, Kirkland, WA (US); Gus Lopez, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,557

(22) Filed: Aug. 17, 2010

(65) Prior Publication Data

US 2010/0312664 A1    Dec. 9, 2010

Related U.S. Application Data

(63) Continuation of application No. 09/280,292, filed on Mar. 29, 1999, now Pat. No. 7,801,775.

(51) Int. Cl.
G06Q 40/00 (2012.01)

(52) U.S. Cl.
USPC .......................................... 705/26.35; 705/35

(58) Field of Classification Search
USPC .......................................... 705/35–45, 26, 27
See application file for complete search history.

(56) References Cited

U.S. PATENT DOCUMENTS 5,835,896 A * 11/1998 Fisher et al. .................... 705/37

FOREIGN PATENT DOCUMENTS

JP    10-320470    12/1998

OTHER PUBLICATIONS

Official Notice of Rejection for Japanese Patent Application No. JP 2000-608317 (Appeal No. 2010-017850) mailed on Apr. 10, 2012, 6 pages.
Interrogation mailed on Sep. 30, 2011 for Japanese Patent Application No. JP 2000-608317, Appeal No. JP 2010-017850, 10 Pages.
Samar, V., "Single Sign-On Using Cookies for Web Applications," IEEE 8$^{th}$ International Workshops on Enabling Technologies: Infrastructure for Collaborative Enterprises, 1999. (WET ICE '99) Proceedings, 1999, pp. 158-163.
Broyer, T., "Cookie-based HTTP Authentication," Network Working Group, Internet Draft, Jan. 4, 2009 [online] [retrieved on Jan. 25, 2013] Retrieved from the internet <URL:http://ltgt.net/projects/http-cookie-auth/draft-broyer-http-cookie-auth-00.html#RFC2617>.

* cited by examiner

*Primary Examiner* — Richard C Weisberger
(74) *Attorney, Agent, or Firm* — Fenwick & West LLP (57) ABSTRACT

A method and system for authenticating users while conducting an auction via a computer system. The system can automatically authenticate users who have previously registered with the auction system and who have enabled automatic authentication. When a user is registered, the system may store authentication information in a cookie on the user's computer. When the user decides to perform a transaction (e.g., list item auction or place a bid for an item) that requires authentication, the system retrieves the stored authentication information. If automatic authentication is enabled, then the system allows the transaction to proceed without manual authentication. If, however, automatic authentication is not enabled or the system does not recognize the stored authentication information, then the system requests manual authentication. The use of automatic authentication allows a user to enter information relating to a transaction without manually entering any identification information.

10 Claims, 9 Drawing Sheets

Fig. 1

SUBMIT A BID — 100

- 101 — ITEM DESCRIPTION
- 102 — AUCTION INFO
- 103 — MINIMUM BID $XXX
- 104 — ENTER BID ______
- 105 — SUBMIT BID

Fig. 2

BUYER AUTHENTICATION — 200

TO SUBMIT THE BID OF $XXX — 201 FOR

- 202 — ITEM DESCRIPTION

PLEASE ENTER THE FOLLOWING

- 203 — USER ID ______
- 204 — PASSWORD ______
- 205 — SUBMIT BID

USER AUTHENTICATION IN AN AUCTION SYSTEM

RELATED APPLICATIONS

The present application claims the benefit and priority under 35 U.S.C. §120 of U.S. application Ser. No. 09/280,292, filed Mar. 29, 1999, entitled "Method and System for Authenticating Users When Conducting Commercial Transactions Using A Computer," which is hereby incorporated herein in its entirety by reference.

TECHNICAL FIELD

The present invention relates generally to conducting electronic commerce, and more particularly, to authentication of users conducting commercial transactions on a computer network.

BACKGROUND OF THE INVENTION

Because it facilitates electronic communications between vendors and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to engage in electronic commerce. Therefore, it is important that techniques be developed to facilitate conducting electronic commerce.

The Internet facilitates conducting electronic commerce, in part, because it uses standardized techniques for exchanging information. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special-purpose application program that effects the requesting of web pages and the displaying of web pages.

Currently, web pages are generally defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The World Wide Web portion of the Internet is especially conducive to conducting electronic commerce. Many web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming web page to the client computer system and schedules shipment of the items.

The World Wide Web is also being used to conduct other types of commercial transactions. For example, some server computer systems have been developed to support the conducting of auctions electronically. To conduct an auction electronically, the seller of an item provides a definition of the auction via web pages to a server computer system. The definition includes a description of the item, an auction time period, and optionally a minimum bid. The server computer system then conducts the auction during the specified time period. Potential buyers can search the server computer system for an auction of interest. When such an auction is found, the potential buyer can view the bidding history for the auction and enter a bid for the item. When the auction is closed, the server computer system notifies the winning bidder and the seller (e.g., via electronic mail) so that they can complete the transaction.

Commercial transactions may involve the transmittal of sensitive information (e.g., a credit card number) from a buyer to a seller. Because this information when transmitted over the Internet may pass through various intermediate computer systems on its way to its final destination, security is a concern. Sellers use various techniques to help ensure that their customers' sensitive information is secure. For example, sellers use various encryption techniques when transmitting such sensitive information to ensure its security.

Although the encryption of sensitive information may provide adequate security, it is very time-consuming and inconvenient for a buyer to re-enter such sensitive information for each commercial transaction. Some web sites store the sensitive information for a buyer so that the buyer does not need to re-enter the information when the next commercial transaction is conducted. When the buyer next conducts a commercial transaction, the buyer can identify themselves with a user identification and password, and the web site can then retrieve the sensitive information that it stored for the buyer. In this way, the sensitive information is not transmitted over the Internet and not re-entered by the buyer. If a buyer conducts multiple commercial transactions at one time, the buyer may need to re-enter the user identification and password for each commercial transaction. This entry of the user identification and password, referred to as "manual authentication," can be cumbersome.

Some web sites avoid this manual authentication altogether. Such web sites store the identity of the buyer on the buyer's computer, for example, as a cookie. When the buyer next accesses the web site, the web site can automatically identify the buyer by retrieving the buyer's identification that was stored on the buyer's computer. The web site can then retrieve and use the buyer's sensitive information without requiring manual authentication. This approach, however, is only practical when the buyer knows that no unauthorized person can access the buyer's computer.

SUMMARY OF THE INVENTION

Embodiments of the present invention provide methods and systems for conducting commercial transactions using a computer system. In one embodiment, the system provides to a user's computer a displayed description (e.g., web page) for entry of information relating to the commercial transaction by the user. The user's computer presents a display to the user in accordance with the display description. The user can then enter information relating to the commercial transaction. For example, if the commercial transaction is to bid on an item being auctioned, then the display description may describe the item being auctioned and request the user to enter a bid amount and to select a button to submit the bid the user's computer then sends the entered information to the system. When the system receives the information entered by the user, the system determines whether the user can be automatically authenticated. If so, the system allows the commercial transaction to proceed. If, however, the system cannot automatically authenticate the user, then the system provides to the user's computer another display description for entry of authentication information. When the system receives the entered authentication information from the user's computer, if the system can verify the user's authenticity, then the system allows the commercial transaction to proceed. In this way, the system defers the entry of the authentication information until it determines that such information is necessary.

In another embodiment, the system places a bid for an item that is being auctioned. To place the bid, the system provides to a user's computer the display description for entry of a bid amount and for performing a single action after entry of the bid amount to submit the bid. When the single action is performed, the user's computer sends the entered bid amount to the system. The system then effects the placing of the submitted bid for the item at the entered bid amount. Alternatively, the system may include with the display description a suggested bid amount and an indication of a single action to perform to submit a bid for the item at that suggested bid amount. The user can then perform that action to submit a bid at the suggested bid amount without entry of any bid amount. If the system cannot authenticate the user, then the system provides to the user's computer another display description for authenticating the user. The system may also provide a display description for confirming the submitted bid prior to placing the submitted bid for the user.

DETAILED DESCRIPTION OF INVENTION

Embodiments of the present invention provide a method and system for controlling the bidding for an item during an auction. The auction system facilitates the placing of bids by potential buyers during an auction. The item "item" refers to any product, service, or combination of product and service or, more generally, exchangeable entity. In one embodiment, the auction system reduces the actions that a buyer needs to perform to place a bid. In this embodiment, the auction system executing at a server computer provides a web page to client computer that identifies the item being auctioned, that provides a field for entry of a bid amount by the buyer, and that provides an indication of a single action to perform after entry of the bid amount to submit the bid. When the client computer displays the web page to the buyer, the buyer enters the bid amount and performs the single action (e.g., click on a button) to notify the auction system. In response to performing the single action, the client computer notifies the auction system that a bid is being submitted. Upon receiving the notification, if the auction system can automatically authenticate the buyer, the auction system places the bid for the buyer by recording the bid amount as the highest bid. When the auction for that item closes, the auction system notifies the seller and the buyer who placed the highest bid. The seller and buyer can then complete the sale of the item. The use of a web page that requires only entry of the bid amount and performance of the single action facilitates the submitting of a bid and thus encourages buyers to participate in the auction.

The auction system automatically authenticates a user who is recognized by the auction system, for example, based on a cookie stored on the user's computer and who is enabled to participate in auctions. When automatic authentication is enabled, a buyer can submit bids and a seller can list items without having to enter authentication information (e.g., user identification and password). Because, when automatic authentication is enabled, the auction system does not prompt the user to manually enter authentication information, automatic authentication is referred to as single-action (e.g., clicking on a button) auction participation. In one embodiment, when automatic authentication is not enabled, the auction system provides automatic authentication for a time period after a user manually provides authentication information. For example, if a buyer submits a bid, the auction system will prompt for manual authentication when automatic authentication is not enabled. If the buyer then submits another bid within a certain time period, the auction system automatically authenticates the buyer. This process of automatically authenticating a user during a certain time period after manual authentication is referred to as "semi-automatic authentication" since the user needs only perform one manual authentication for a series of commercial transactions.

When manual authentication is required, the auction system may defer that authentication (and new user registration as discussed below) until as late as possible before placing the bid. The auction system provides a web page that identifies the item being auctioned and that provides a field for entry of the bid amount by the buyer. When the client computer displays the web page, the buyer enters the bid amount and submits the bid by, for example, pressing the enter key. The client computer then notifies the auction system that the buyer is trying to submit a bid. When the auction system receives the notification, the auction system may check to ensure that the bid is acceptable. A bid may not be acceptable if the bid amount is too low or the auction has recently closed. If the bid is acceptable, the auction system provides a web page that requests authentication information from the buyer (if the user has not yet registered with the auction system or is registered but has not yet provided enough information to participate in an auction, the auction system requests such registration or additional information. When the auction system receives the authentication information from the client computer, it verifies the authentication information and places the bid for the item on behalf of a buyer. The use of a two-web page process in collecting the bid amount and the authentication information has the advantage of deferring the authentication (or registration) until the bid amount is determined to be acceptable. This process also encourages buyers to participate in an auction because the first web page of this two-web page process is less intimidating than a single-web page process that combines the entering of both the bid amount and of the authentication information on a single web page. This deferred authentication card (and registration) is particularly useful in a wide variety of commercial and non-commercial transactions. For example, deferred authentication can be used when a buyer is purchasing an item at a fixed price or when a user is requesting access to a resource with restricted access or with unrestricted access that the supplier of the resource wants to monitor.

The auction system provides a deferred registration process by which new users (e.g., buyers and sellers) can register with the auction system. If the auction system does not recognize a buyer who has submitted a bid, the auction system requests the buyer to register. During registration, the user provides to the auction system with information such as a user identification (e.g., email address), home address, phone number, billing information (e.g., a credit card number), and a password. The auction system may also have access to registration information for some users who, for example, have previously made a retail purchase through a web site associated with the auction system. Once a user is registered, the auction system may store authentication information on the user's computer system as, for example, a cookie. When the user next accesses the auction system (assuming automatic authentication is enabled), it can automatically recognize the user based on the stored authentication information. Even though a user is registered with the auction system, the auction system may require additional information from the user before allowing the user to participate in auctions as either a buyer or a seller. The auction system collects this additional information at the completion of placing a bid or at the completion of listing of an item to be auctioned. This deferring of registration is also useful when conducting other types of transactions as discussed above. The auction system may also allow a user to enable or disable automatic authentication (e.g., single-action auction participation). With automatic authentication enabled, a user who is recognized and enabled to participate in an auction can perform a single action (e.g., clicking on a button) to submit bids and list items without manual authentication.

The auction system may also allow a buyer to place a bid without even entering a bid amount. The auction system provides to the client computer a web page that identifies the item being auctioned, that includes a predefined bid amount, and that provides an indication of the single action to perform to submit the bid at that predefined bid amount. When the client computer displays the web page, the buyer performs that single action to submit the bid, and the client computer then notifies the auction system. When the auction system receives the notification, the auction system either places the bid at that time if the auction system can automatically authenticate the buyer or requests manual authentication by the buyer before placing the bid. The auction system can calculate the predefined bid amount in various ways. For example, the predefined bid amount can be the highest bid plus the bid increment. Alternatively, the auction system may statistically analyze the bidding history of the item being auction or similar items that have been or are being auctioned to suggest a bid amount.

As described above, the auction system may automatically authenticate a buyer when the buyer has recently performed a manual authentication by entering authentication information. For example, when the buyer enters the bid and manually provides authentication information as requested by the auction system, the auction system may automatically authenticate all bid submission from the buyer's computer system for a period of time. During that time period, the buyer can submit additional bids without the auction system re-requesting manual authentication. After expiration of that time period, the auction system will request manual authentication of the buyer when the buyer next enters a bid. The auction system may restart a time period that has not expired when it detects that the buyer is still actively accessing the auction system. For example, the auction system may restart the time period when the buyer accesses any web page of the auction system. Alternately, the auction system may restart the time period whenever the buyer performs an activity that requires authentication (e.g., submits a bid). The auction system may also optionally allow the buyer to specify the time period and to specify the conditions for restarting the time period. One skilled in the art will appreciate that different conditions can be used to determine when a time period can be restarted. For example, the auction system can analyze the interaction between the buyer and the auction system to determine both an appropriate restarting condition and time period. If a buyer typically enters bids quickly, then the auction system may set the time period to a relatively small period so that when the buyer stops bidding the automatic authentication can expire quickly. In contrast, if the buyer submits bids at a slow pace, then the auction system may set the time period to a relatively large period so that the buyer is not needlessly re-requested to perform a manual authentication.

Although the techniques of the present invention are described primarily in the context of placing a bid for an item, the techniques can be used in other auction-related contexts, such as when a seller lists an item to be auctioned, and in contexts not related to auctions. Many commercial transaction and even noncommercial transactions (e.g., accessing proprietary information via the world wide web) require authentication and registration. For example, when an auction is closed, the auction system may provide the email address of the buyer to the seller and vice versa. Since email addresses are sensitive information, the auction system may require authentication of the party requesting the email address of the other party. This authentication can be automatic, for example, if the requesting party has recently provided a manual authentication. Authentication, automatic or manual, may be required when a seller sets up an auction to list an item, when a buyer places a want advertisement, when a seller places a for sale advertisement, when a seller or buyer changes sensitive information (e.g., their email address or credit card information), and so on. Also, a transaction system, commercial or noncommercial, may allow some activity to proceed with automatic authentication and other activity to always require manual authentication. For example, the supplying of an email address of one user to another user is particularly sensitive, so the transaction system may always require manual authentication.

Figure 1:
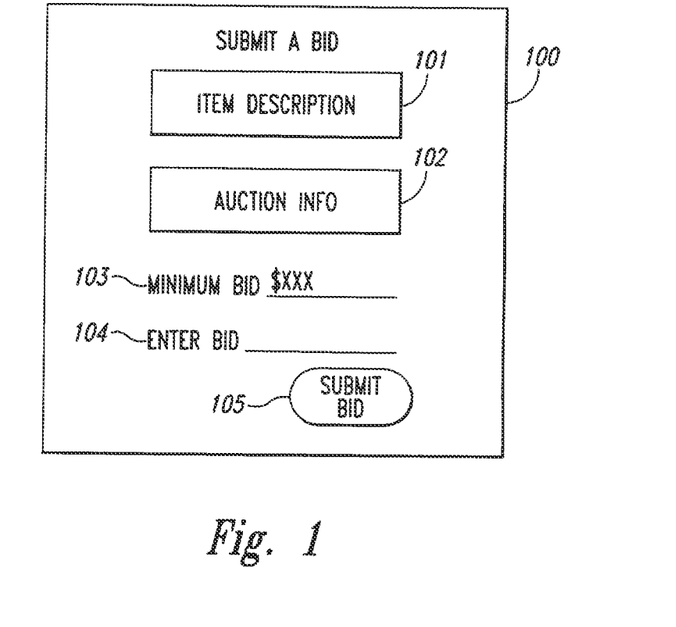
FIG. 1 illustrates a display for submitting a bid.

FIG. 1 illustrates a display for submitting a bid. The display 100 includes a description of the item 101, auction information 102, a minimum bid amount 103, an enter bid field 104, and a submit bid button 105. The buyer can identify the item from the item description and review the auction information, which may provide the bidding history of the auction and indicate the time when the auction will close. The minimum bid indicates the minimum bid amount that can be placed on the item. The minimum bid is typically the highest bid plus a bid increment established when the auction was set up. The buyer enters the bid amount into the enter bid field and then selects the submit bid button to submit the bid. When the submit bid button is selected, the client computer notifies the auction system that the buyer is trying to submit a bid. If authentication is automatic (e.g., because the auction system recognizes the buyer and automatic or semi-automatic authentication is enabled), then the auction system places the bid for the buyer. Otherwise, the auction system requests manual authentication before placing the bid. In one embodiment, the auction system may request confirmation of the bid via a separate web page especially when authentication is automatic.

Figure 2:
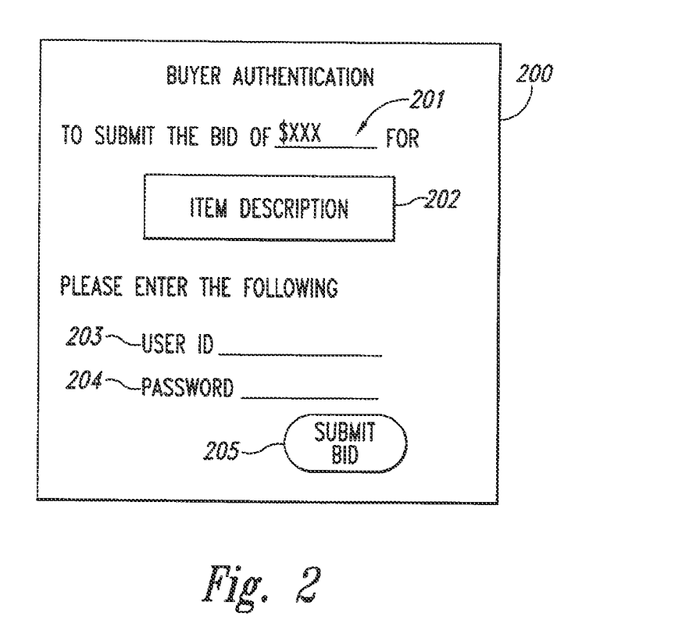
FIG. 2 illustrates the display for requesting authentication of a buyer.

FIG. 2 illustrates the display for requesting authentication of a buyer. The display 200 contains the bid amount field 201, an item description field 202, a user identification field 203, a password field 204, and a submit bid button 205. A buyer manually performs authentication by entering their user identification and password and then selecting the submit bid button. When the buyer selects the submit bid button, the client computer notifies the auction system of the user identification and password. The auction system then verifies whether the password matches the user identification. If verified, then the authentication system places the bid for the buyer. The authentication system may also restart the time period for expiration of the authentication.

Figure 3:
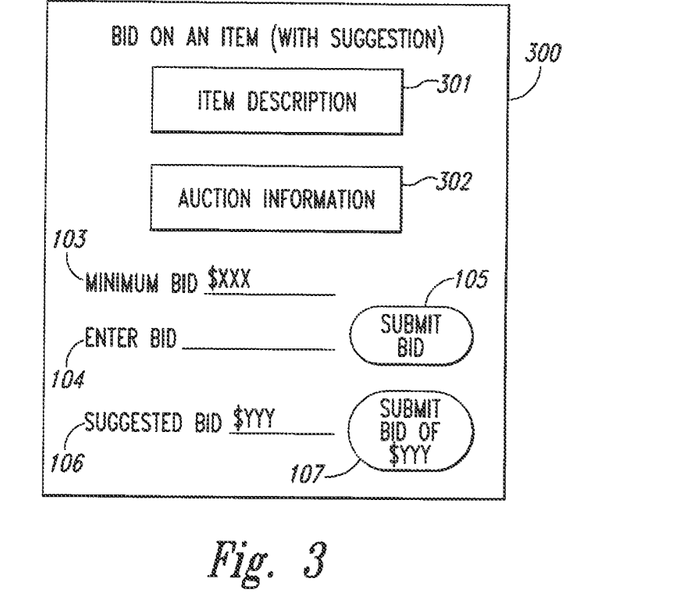
FIG. 3 illustrates a display for suggesting a bid amount to a buyer.

FIG. 3 illustrates a display for suggesting a bid amount to a buyer. The display 300 contains a description of the item 301, auction information 302, a minimum bid field 303, an enter bid field 304, and a submit bid button 305 that each function as described for FIG. 1. This display, however, also contains a suggested bid field 306 and a submit bid at suggested price button 307. The suggested bid field contains a suggested bid amount. The auction system may calculate the suggested bid amount based on the bid increment or by a statistical analysis of bidding history. The buyer can submit a bid at the suggested price by clicking on the submit bid at suggested price button. When the buyer selects that button, the client computer notifies the auction system that the buyer is submitting a bid at the suggested price. The auction system can then place the bid for the suggested amount for the buyer after automatic or manual authentication. The auction system can present a suggested price to a buyer in many different ways. For example, the auction system can prefill the enter bid field of FIG. 1 with a suggested bid amount and then user need only select the submit bid button to submit the bid at the suggested bid amount. Alternately, the auction system can display a suggested bid amount, and the buyer can enter the suggested bid amount into the enter bid field as desired.

Figure 4:
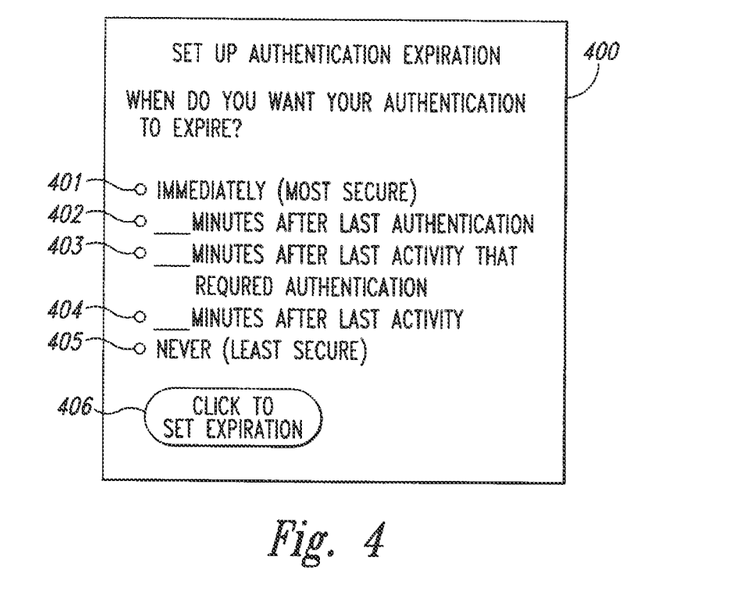
FIG. 4 illustrates a display for establishing a condition for authentication with semi-automatic authentication expiration.

FIG. 4 illustrates a display for establishing a condition for authentication with semi-automatic authentication expiration. A typical system to support commercial transactions would not allow users the option of establishing their authentication expiration conditions and time period. Rather, the system may use fixed conditions and time periods or may allow an administrator of the system to set the conditions and time periods for all users. Nevertheless, this display is described as if a user is customizing their own conditions and time periods. The display 400 includes five radio buttons 401-405 for each of the expiration conditions. Condition 401 indicates that the buyer will be authenticated whenever an action requiring authentication is performed, in other words, any authentication expires immediately. This first condition thus enables manual authentication. The next three conditions enable forms of semi-automatic authentication. Condition 402 allows for expiration a certain time period after the last manual authentication, that is the time period is restarted after each manual authentication. Condition 403 allows for expiration a certain time period after the last activity that requires authentication, that is the time period is restarted whenever the buyer performs an activity that requires authentication. Condition 404 allows for expiration a certain time period after the last activity by a buyer, that is the time period is restarted whenever the buyer accesses the auction system. Condition 405 indicates that the buyer will never need to be re-authenticated, for example, because the auction system stores authentication information on the client system and automatically retrieves and authenticates that information. This last condition is equivalent to enabling automatic authentication. The buyer selects the set expiration button 406 after selecting one of the conditions and entering the length of the time period, which may default to a predefined time period. The auction system, of course, only restarts time periods that have not yet expired.

Figure 5:
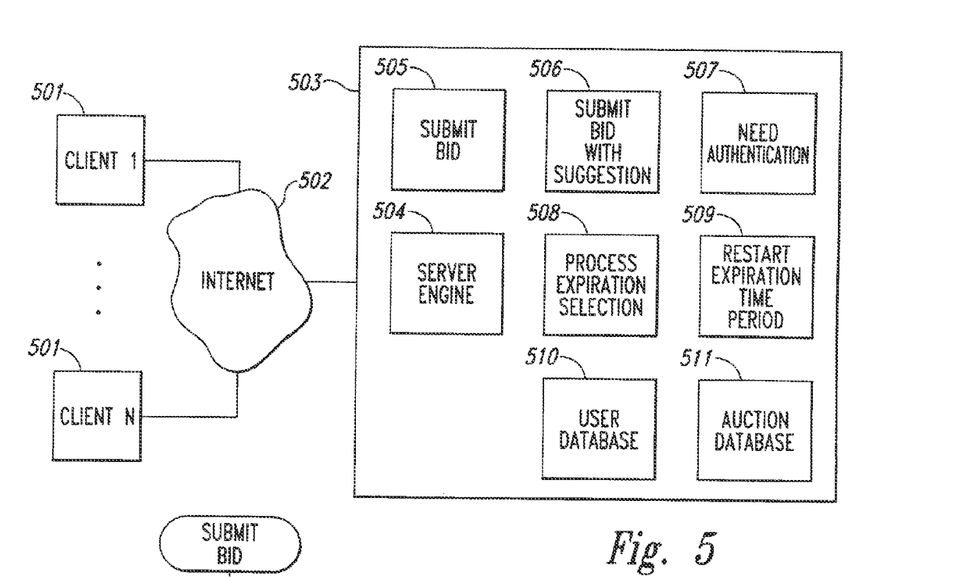
FIG. 5 is a block diagram illustrating the components of the auction system in one embodiment of the present invention.

FIG. 5 is a block diagram illustrating the components of the auction system in one embodiment of the present invention. The client computers 501 and the server computer 503 are interconnected via the Internet 502. The computers may include a central processing unit, memory, input devices (e.g., keyboard and pointing device), output devices (e.g., display devices), and storage devices (e.g., disk drives). The memory and the storage devices are computer-readable media that may contain computer instructions that implement the auction system of the present invention. The client computers may use a browser to access various web pages via the Internet. The server computer implements the auction system of the present invention. The auction system includes a server engine 504, a submit bid component 505, a submit bid at suggested price component 506, a need authentication component 507, a process expiration selection component 508, a restart expiration time period component 509, a user data base 510, an auction database 511, and other components not shown in this figure. The server engine receives requests for resources (e.g., web pages) via the Internet and coordinates the generation and transmission of the resources. The submit bid component controls the submitting of bids by buyers. The submit bid at suggested price component controls the submitting of a bid at a price suggested by buyers. The need authentication component determines whether manual authentication is required in one embodiment of the present invention. The process expiration selection component controls the setting of the expiration condition and time period by either a user or an administrator. The restart expiration component restarts the time period as appropriate. The user database contains information for each buyer and seller. The information may include the user's name, moniker, home address, email address, billing information, delivery information, and so on. The auction database contains information for each auction including the identification of the seller, a description of the item being auctioned, a minimum bid amount, a bid increment, the time when the auction closes, and bidding history, which may include, for each bid placed, the moniker of the bidder, the bid amount, and the time that the bid was placed.

One skilled in the art will appreciate that the concepts of the present invention can be used in various environments other than the Internet. For example, the concepts can also be used in an electronic mail environment in which electronic mail messages may describe an auction or sale. In general, a display description may be in an HTML format, email format, or any other format suitable for displaying information. Also, various communication channels may be used such as a local area network, wide area network, or a point-to-point dial-up connection instead of the Internet. The commercial transactions may also be conducted within a single computer environment, rather than in a client/server environment. Also, a server system may comprise any combination of hardware or software that can support these concepts. In particular, a web server may actually include multiple computers. A client system may comprise any combination of hardware or software that interacts with the server system. These client systems may include television-based systems and various other consumer products through which commercial transactions or noncommercial transactions can be conducted.

Figure 6:
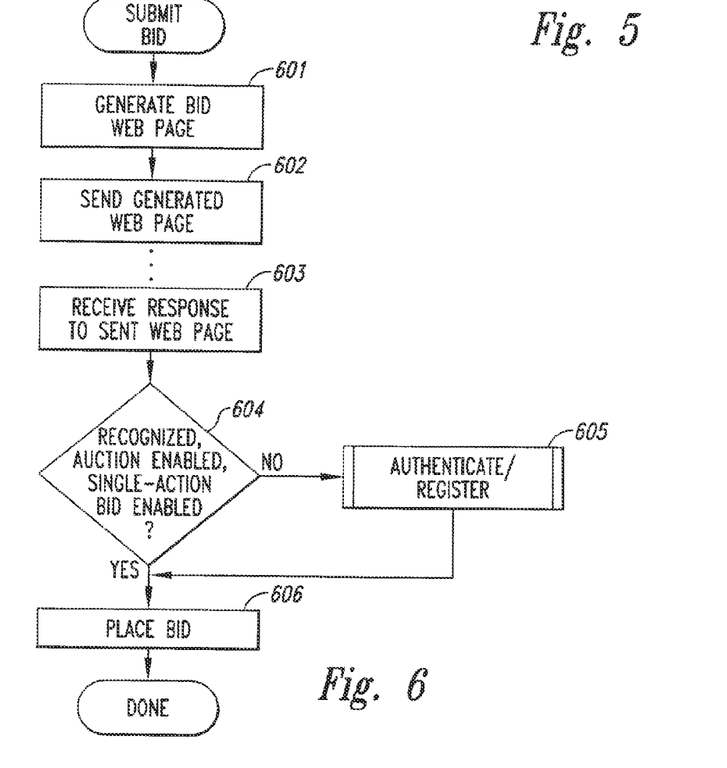
FIG. 6 is a flow diagram of an example implementation of a submit bid routine that implements the submit bid component.

FIGS. 6-9 are flow diagrams of example implementations of a submit bid, submit bid at a suggested amount, and list item components the auction system. Each component is described as the single routine that is implemented on a computer to illustrate the processing of the components. One skilled in the art will appreciate that each of these components will typically be implemented as several separate routines. FIG. 6 is a flow diagram of an example implementation of a submit bid routine that implements the submit bid component. This routine provides a web page to a buyer's computer that describes the item being auctioned and the bidding history, and requests the buyer to enter a bid amount and submit the bid. When the routine receives an indication that the buyer has submitted the bid, the routine determines whether the auction system can recognize the buyer. The auction system recognizes the buyer, for example, when authentication information is provided with the submitted bid. The client computer may retrieve this authentication information from a cookie stored at the client computer by the auction system. If the auction system recognizes the buyer and if participation in auctions and automatic authentication are enabled for that buyer, then the routine places the bid for the buyer. Otherwise, the routine requests authentication or registration of the buyer depending on whether the buyer has been previously registered with the auction system. In step 601, the routine generates a bid web page that describes the auctioned item and the bidding history, and requests the buyer to enter a bid amount and submit the bid. In step 602, the routine sends the generated web page to the client computer. Eventually, as indicated by the ellipsis, the auction system receives a response to the submit bid web page in step 603. In step 604, if the routine recognizes the buyer and if participation in auctions and automatic authentication (e.g., "single-action bid enabled") are enabled, then the routine continues that step 606, else the routine continues at step 605. The routine checks the user database to determine whether the buyer is enabled to participate in auctions and has enabled automatic authentication. In step 605, the routine invokes an authenticate/register routine to authenticate or register the buyer. In step 606, the routine places the bid for the buyer and completes.

Figure 7:
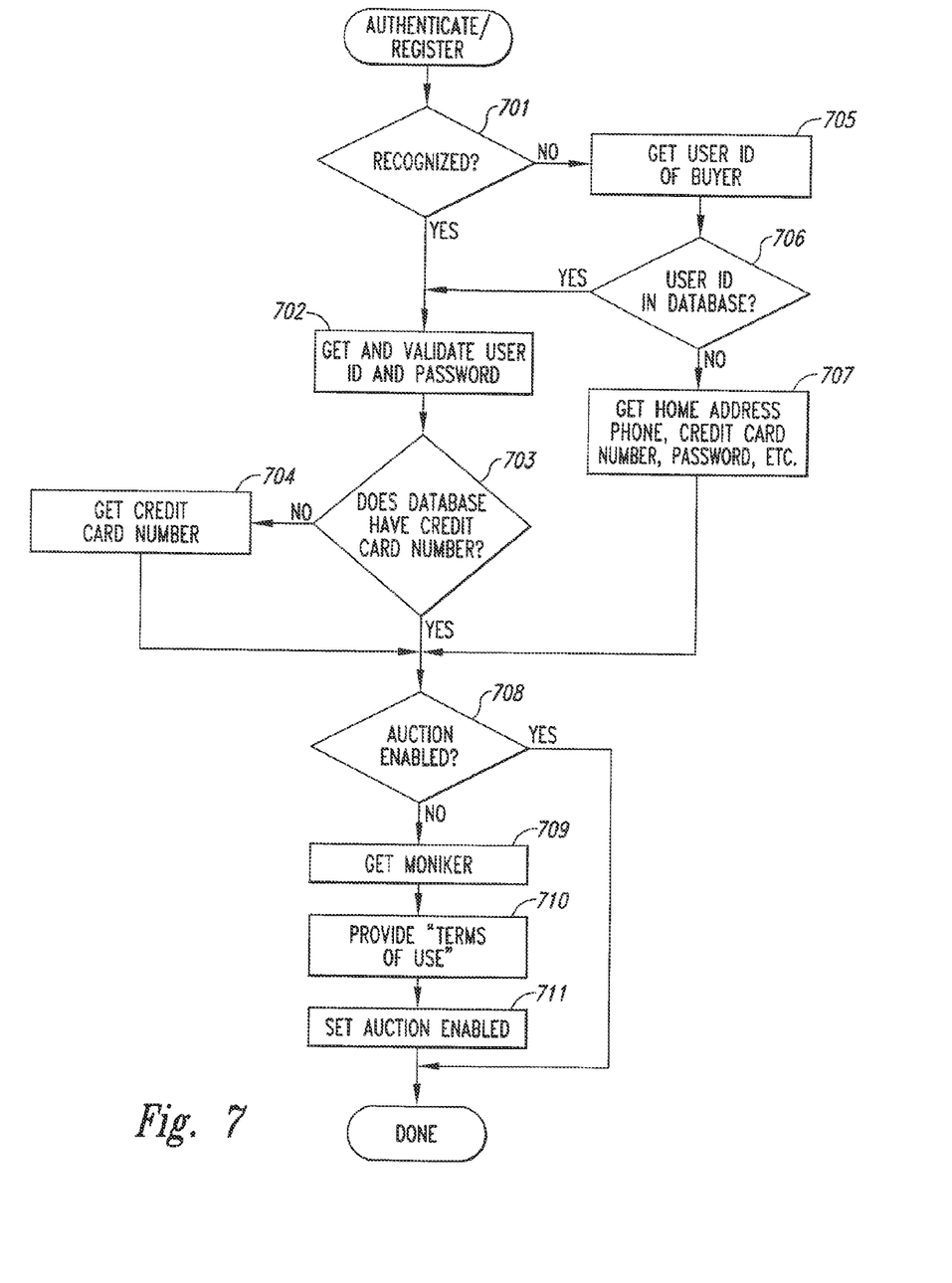
FIG. 7 is a flow diagram of an example implementation of the authenticate/register routine that provides manual authentication.

FIG. 7 is a flow diagram of an example implementation of the authenticate/register routine that provides manual authentication. This routine is invoked when some level of authentication or registration is needed for a user. If the auction system recognizes the user, then the auction system requests manual authentication. If the auction system does not recognize the user, then the auction system requests the user to enter their user identification (e.g., email address). Based on the user identification, the auction system determines whether that user has already been registered. If the user has already been registered, then the auction system requests manual authentication because the auction system either did not recognize automatically supplied authentication information (e.g., a cookie) or the user has not enabled automatic authentication. If a registered user is not enabled to participate in auctions, then the auction system requests additional information from the user so that user can participate in auctions. In step 701, if the routine recognizes the user, then the routine continues that step 702, else the routine continues that step 704. In step 702, the routine requests, retrieves, and validates the user's user identification and password. The routine generates an authentication web page, sends the generated web page to the client computer, receives a response that includes the user identification and password, and then validates that the password is correct for that user identification by checking the user database. In step 703, if the user database does not include billing information (e.g., credit card number) for the user, then the routine requests billing information from the user in step 704. In steps 705-707, the routine performs processing for a user that is not recognized by the auction system. In step 705, the routine requests and receives the user identification from the user. In step 707, if the received user identification is not in user database, then the routine continues that step 707, else the routine continues that step 702. In step 707, the routine requests and receives information (e.g., home address, phone number, credit card number, and password) needed to register the user. If the user identification is in the database, then in step 702 the routine would only need to prompt the user for their password. In step 708, if the user is enabled to participate in auctions, then the routine completes, else the routine prompts the user to enter information so that the user can be enabled to participate in auctions. In step 709, the routine prompts the user for a moniker or nickname that the user wishes to use when participating in auctions. In step 710, the routine provides the user with the terms of use for participating in auctions. In step 711, the routine stores a flag in the user database to indicate that the buyer is enabled to participate in auctions. The routine then completes. The authenticate/register routine can be modified to support semi-automatic authentication. In particular, if the user is recognized in step 701, then the routine can determine whether semi-automatic authentication is enabled and whether the authentication expiration period has expired. If enabled and not expired, then the routine can skip step 702. This routine may make this determination by invoking the need authentication routine described below.

Figure 8:
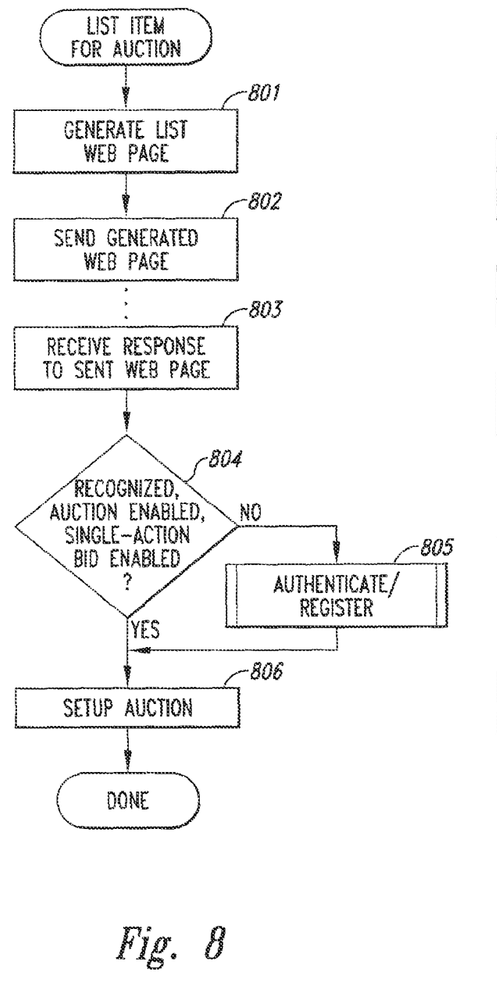
FIG. 8 is a flow diagram of an example implementation of a list item auction routine.

FIG. 8 is a flow diagram of an example implementation of a list item auction routine. This routine prompts a seller for information describing the item to be auctioned and information defining how the auction is to be conducted. For example the information defining how the auction is to be conducted may include the type of auction, the minimum bid, the bid increment, and the duration of the auction. If the auction system does not recognize the seller, if the seller is not enabled to participate in auctions, or if the buyer has not enabled automatic authentication, then the routine requests authentication or registration prior to setting up the auction. In step 801, the routine generates a list item auction web page. In step 802, the routine sends the generated web page to the client computer of the seller. In step 803, the routine receives a response from the sent web page. In step 804, if the auction system recognizes the seller, if the seller is enabled to participate in auctions, and if the seller has enabled automatic authentication, then the routine continues at step 806, else the routine continues at step 805. In step 805, the routine invokes the authenticate/register routine. In step 806, the routine sets up the auction by storing the information describing the auction in the auction database. The routine then completes.

Figure 9:
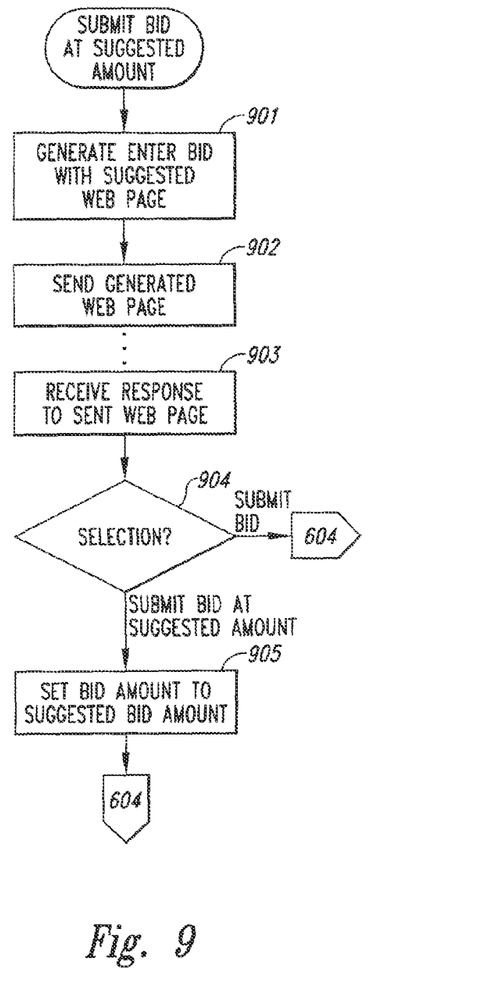
FIG. 9 is a flow diagram of an example implementation of the submit bid at suggest amount routine.

FIG. 9 is a flow diagram of an example implementation of the submit bid at suggest amount routine. This routine functions similarly to the submit bid routine, except that it determines whether the submit bid at suggested amount button has been selected. In step 901, the routine generates a submit bid at suggested amount web page that contains the information of submit bid web page along with a suggested bid amount and a submit bid at suggested price button. In step 902, the routine sends the generated web page to the client computer. As described above, the auction system can determine the suggested amount in various ways. Eventually, the auction system receives a response to the submit bid at suggested amount web page in step 903. In step 904, the routine determines whether the buyer selected the submitted bid button or selected the submit bid at suggested amount button. If the buyer selected the submit bid button, then the routine continues with the processing at step 604 of FIG. 6. If the buyer selected the submit bid at suggested amount button, then the routine continues that step 905. In step 905, the routine sets the bid amount to the suggested amount and continues at step 604 of FIG. 6.

Figure 10:
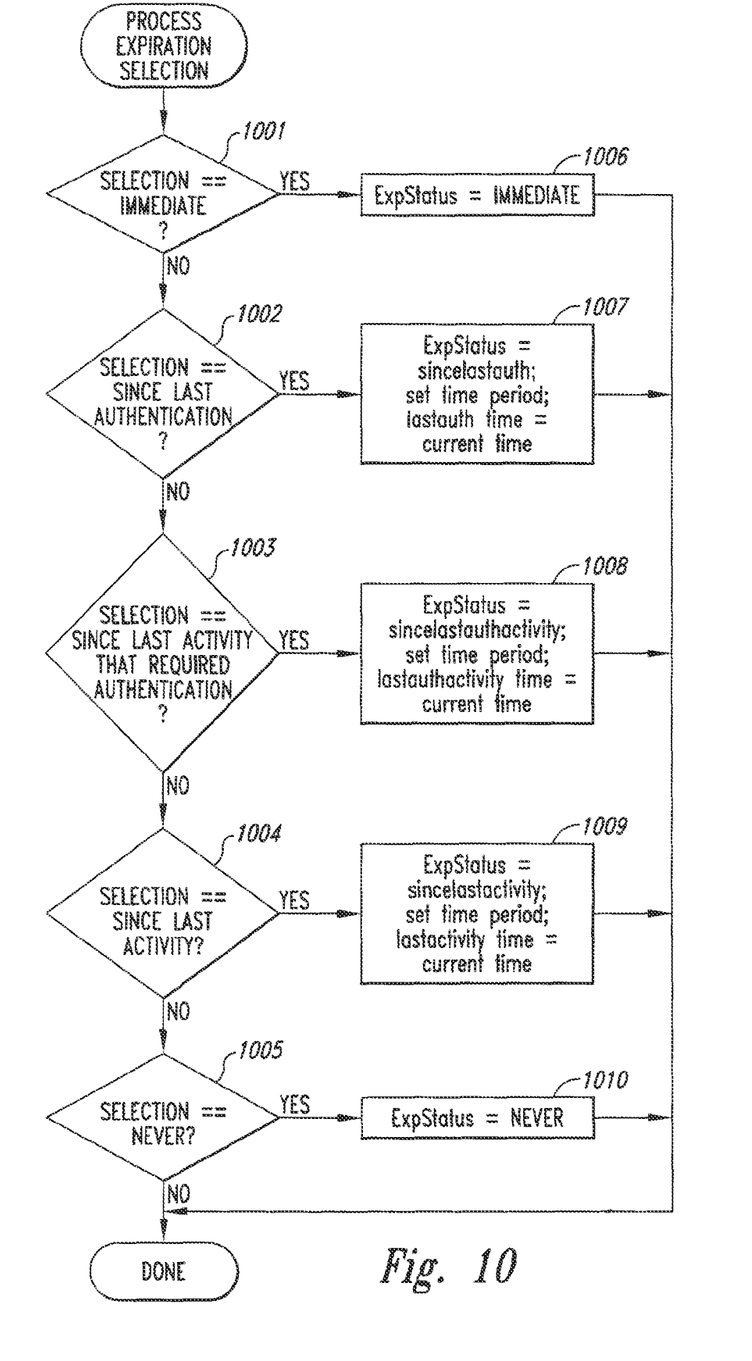
FIG. 10 is a flow diagram of an example implementation of semi-automatic authentication of a process expiration selection routine.
Figure 11:
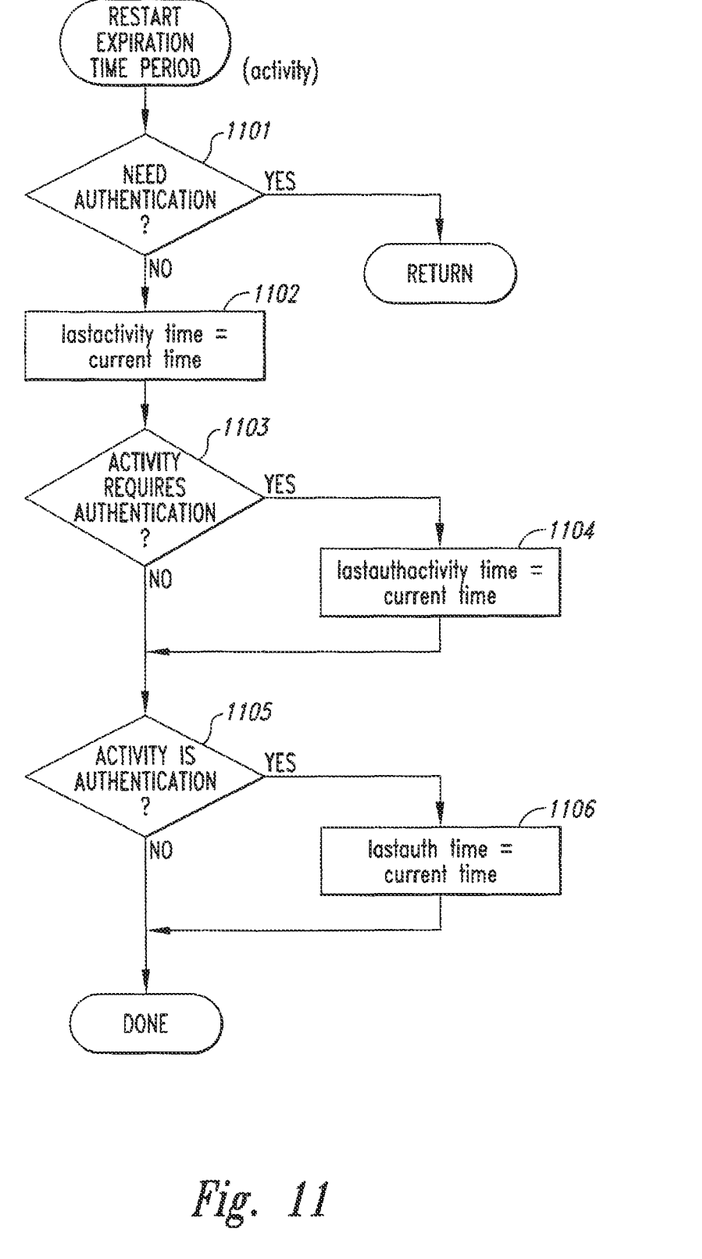
FIG. 11 is a flow diagram of an example implementation of a restart expiration time period routine.
Figure 12:
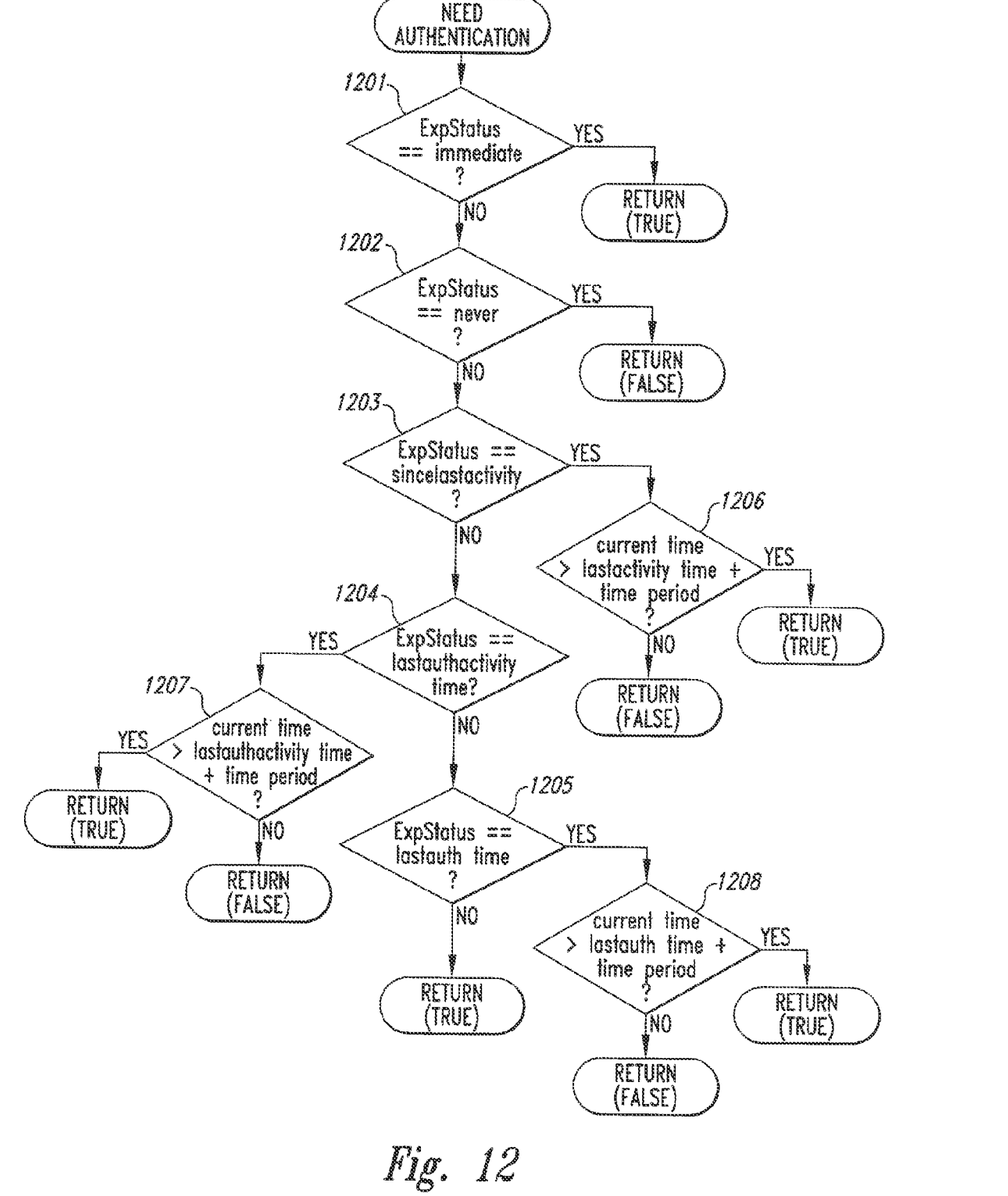
FIG. 12 is a flow diagram of an example implementation of the need authentication routine.

FIGS. 10-12 are flow diagrams illustrating example implementations of components of the auction system. FIG. 10 is a flow diagram of an example implementation of semi-automatic authentication of a process expiration selection routine. This component sets the expiration status to indicate the expiration condition and as appropriate sets the time period and initializes an activity time to the current time to indicate the start of the time period. The routine processes the selection of FIG. 4. In step 1001-1005, the routine determines the radio button that was selected by the buyer. If the buyer indicated that the expiration was to the immediate (i.e., manual authentication), then the routine sets the expiration status to immediate in step 1006. If buyer indicated that the expiration was to be based on the last authentication, then the routine sets the expiration status to indicate since last authentication, sets the time period as entered by the buyer, and initializes the last authorization time to the current time in step 1007. If the buyer indicated that the expiration was based on the last activity that required authentication, then the routine sets the expiration status to indicate last authenticated activity, sets the time period as entered by the buyer, and initializes the time of last authenticated activity to the current time in step 1008. If the buyer indicated that the expiration was to be based on the last activity, then the routine sets the expiration status to indicate last activity, sets the time period as entered by the user, and initializes the last activity time to the current time in step 1009. If the buyer indicated that there was never to be an expiration (i.e., automatic authentication), then the routine sets the expiration status to never in step 1010. The routine then completes.

FIG. 11 is a flow diagram of an example implementation of a restart expiration time period routine. This routine is passed an indication of the activity that was performed by a user and restarts the authentication expiration time period as appropriate. In step 1101, if the current time period has not yet expired, which can be determined by invoking the need authentication routine (describe below), then the routine returns, else the routine continues at step 1102. In step 1102, the routine sets the last activity time to the current time. In step 1103, if the passed activity requires authentication, then the routine continues that step 1104, else the routine continues that step 1105. In step 1104, the routine sets the last authenticated activity time to the current time. In step 1105, if the passed activity is an authentication, then the routine continues at step 1105, else the routine completes. In step 1106, the routine sets the last authentication time to the current time and completes.

FIG. 12 is a flow diagram of an example implementation of the need authentication routine. This routine determines whether authentication is manual, semi-automatic or automatic. In steps 1201-1205, the routine determines the current expiration status. If the expiration status is immediate, then routine returns an indication that manual authentication is needed. If the expiration status is never, then the routine returns and indication that manual authentication is not needed. In step 1206, if the expiration status is since last activity, then the routine continues at step 1206. In steps 1206-1208, if the time period has expired based on the current expiration status, then the routine returns with an indication that manual authentication is needed, else the routine returns an indication that manual authentication is not needed.

Figure 13:
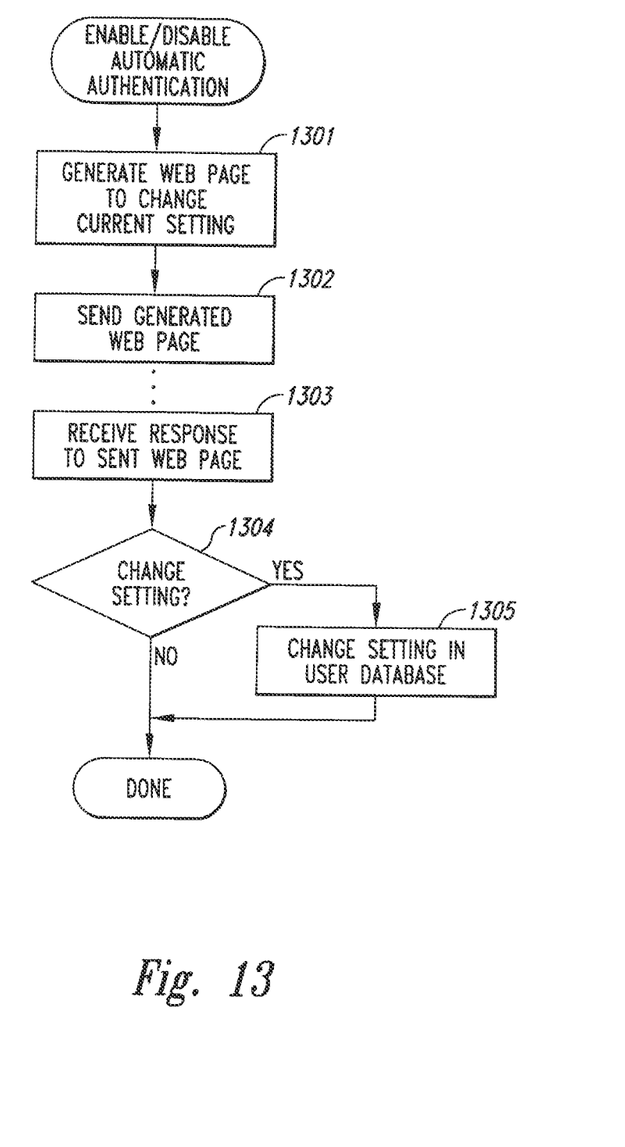
FIG. 13 is a flow diagram of an example implementation of an enabled/disable automatic authentication routine.

FIG. 13 is a flow diagram of an example implementation of an enabled/disable automatic authentication routine. This routine allows a user to indicate whether automatic authentication is enabled or disabled for them. In step 1301, the routine generates a web page to change the current setting. To generate the web page, the routine retrieves the user's current setting from the user database. In step 1302, the routine sends the generated web page to the user's computer. In step 1303, the routine receives a response to the sent web page from the user's computer. This response indicates whether the user wants to change the current setting. In step 1304, if the response indicates that the user wants to change the setting, then the routine continues at step 1305, else the routine completes. In step 1305, the routine changes the setting in the user database and completes.

From the foregoing it will be appreciated that although specific embodiments of the invention have been described herein for purposes of illustration, various modifications may be made without deviate from the spirit and the scope of the invention. Accordingly, the invention is not limited except by the following claims.

What is claimed is:

1. A method in an auction system comprising a server computer for bidding on an item being auctioned, the method comprising:

transmitting a description for display on a client computer, the client computer having authentication information previously stored thereon, the authentication information corresponding to the user, and the description comprising:
information identifying the item to be auctioned,
an enter bid field prefilled with a suggested bid amount for the item, the suggested bid amount generated for a user associated with the client computer, and
an indication of an action that is to be performed to submit a bid on the item, wherein performing the action submits the bid without requiring the user to provide additional authentication information;
in response to the action being performed, receiving, from the client computer, a submit bid request including the suggested bid amount for the item and including the authentication information;
determining whether the user can be automatically authenticated based on the authentication information in the submit bid request, the authentication information corresponding to identification information associated with the user, the identification information previously stored on the auction system; and
in response to a determination that the user can be automatically authenticated based on the authentication information in the submit bid request, automatically authenticating the user and placing the bid on behalf of the user at the suggested bid amount.

2. The method of claim 1, wherein the suggested bid amount is based on a bid increment.

3. The method of claim 1, wherein the suggested bid amount is based on a statistical analysis of a bidding history for the item to be auctioned.

4. The method of claim 1, wherein the information in the submit bid request includes automatic authentication information from a cookie stored on the client computer.

5. The method of claim 1, further comprising: in response to a determination that the user cannot be automatically authenticated based on information in the submit bid request, manually authenticating the user.

6. The method of claim 5, wherein manually authenticating the user comprises:
transmitting to the client computer a display requesting the additional authentication information;
receiving from the client computer the additional authentication information;
determining whether the user associated with the client computer can be authenticated based on the additional authentication information; and
in response to a determination that the user can be authenticated based on the additional authentication information, authenticating the user and placing the bid on behalf of the user at the suggested bid amount.

7. A computer-readable medium storing computer-readable program code comprising instructions for bidding on an item being auctioned, the instructions comprising:
transmitting a description for display on a client computer, the client computer having authentication information previously stored thereon, the authentication information corresponding to the user, and the description comprising:
information identifying the item to be auctioned,
an enter bid field prefilled with a suggested bid amount for the item, the suggested bid amount generated for a user associated with the client computer, and
an indication of an action that is to be performed to submit a bid on the item, wherein performing the action submits the bid without requiring the user to provide additional authentication information;
in response to the action being performed, receiving, from the client computer, a submit bid request including the suggested bid amount for the item and including the authentication information;
determining whether the user can be automatically authenticated based on the authentication information in the submit bid request, the authentication information corresponding to identification information associated with the user, the identification information previously stored on the auction system; and
in response to a determination that the user can be automatically authenticated based on the authentication information in the submit bid request, automatically authenticating the user and placing the bid on behalf of the user at the suggested bid amount.

8. The computer-readable medium of claim 7, wherein the information in the submit bid request includes automatic authentication information from a cookie stored on the client computer.

9. The computer-readable medium of claim 7, the instructions further comprising:
in response to a determination that the user cannot be automatically authenticated based on information in the submit bid request, manually authenticating the user.

10. An auction system comprising a server computer for bidding on an item being auctioned, the auction system, comprising:
a component for transmitting a description for display on a client computer, the client computer having authentication information previously stored thereon, the authentication information corresponding to the user, and the description comprising:
information identifying the item to be auctioned,
an enter bid field prefilled with a suggested bid amount for the item, the suggested bid amount generated for a user associated with the client computer, and
an indication of an action that is to be performed to submit a bid on the item, wherein performing the action submits the bid without requiring the user to provide additional authentication information;
a component for receiving from the client computer a submit bid request including the suggested bid amount for the item and including the authentication information identifying the user in response to the action being performed, and determining whether the user can be automatically authenticated based on the authentication information in the submit bid request, the authentication information corresponding to identification information associated with the user, the identification information previously stored on the auction system; and
a component for automatically authenticating the user and placing the bid on behalf of the user at the suggested bid amount in response to a determination that the user can be automatically authenticated based on the authentication information in the submit bid request.

* * * * *